(12) United States Patent
Smith et al.

(10) Patent No.: US 6,590,356 B2
(45) Date of Patent: Jul. 8, 2003

(54) COMBINATION OF RESISTOR AND PWM ELECTRONIC DEVICE TO CONTROL SPEED OF A PERMANENT MAGNET DC MOTOR

(75) Inventors: Andrew Paul Smith, London (CA); Martin Volkening, London (CA)

(73) Assignee: Siemens VDO Automotive Inc., Mississauga (CA)

( * ) Notice: Subject to any disclaimer, the term of this patent is extended or adjusted under 35 U.S.C. 154(b) by 0 days.

(21) Appl. No.: 10/092,835

(22) Filed: Mar. 7, 2002

(65) Prior Publication Data

US 2003/0062861 A1 Apr. 3, 2003

Related U.S. Application Data

(63) Continuation-in-part of application No. 10/002,860, filed on Nov. 15, 2001.
(60) Provisional application No. 60/324,508, filed on Sep. 24, 2001.

(51) Int. Cl.[7] .................................................. G05B 11/28
(52) U.S. Cl. ........................ 318/254; 318/257; 318/260; 318/432; 318/439; 318/599
(58) Field of Search .................................. 318/257, 260, 318/254, 432, 439, 599

(56) References Cited

U.S. PATENT DOCUMENTS

| | | | | |
|---|---|---|---|---|
| 3,555,289 A | * | 1/1971 | Sobkow | 307/10.1 |
| 3,602,790 A | * | 8/1971 | Kearns | 318/443 |
| 3,757,186 A | * | 9/1973 | Ozawa | 318/514 |
| 5,075,608 A | * | 12/1991 | Erdman et al. | 318/599 |
| 5,365,153 A | * | 11/1994 | Fujita et al. | 318/34 |
| 5,646,497 A | * | 7/1997 | Stickel | 318/799 |
| 5,675,231 A | * | 10/1997 | Becerra et al. | 318/801 |
| 6,055,359 A | * | 4/2000 | Gillett | 388/819 |
| 6,448,724 B1 | * | 9/2002 | Kleinau et al. | 318/254 |

\* cited by examiner

Primary Examiner—Rita Leykin

(57) ABSTRACT

A motor speed control system 10 includes a permanent magnet direct current electric motor 12. A first switch 14 is in series with the motor. A circuit 15 is in series with the first switch 14. The circuit 15 includes a resistor 16 and a second, pulse width modulated controlled, switch 18 in parallel with the resistor 16. An electronic controller 20 is operatively associated with the first and second switches for electronically controlling the first and second switches independently and in combination to control current to the motor to operate the motor at various speeds.

2 Claims, 3 Drawing Sheets

COMBINATION OF RESISTOR AND PWM ELECTRONIC DEVICE TO CONTROL SPEED OF A PERMANENT MAGNET DC MOTOR

This application is a continuation-in-part of U.S. Provisional Application No. 60/324,508 filed on Sep. 24, 2001 and U.S. application Ser. No. 10/002,860, filed on Nov. 15, 2001.

BACKGROUND OF THE INVENTION

The present invention relates generally to permanent magnet electric motors for automobile applications and, more particularly, to a switching arrangement including both a resistor and a pulse width modulated (PWM) controlled switch that operate independently or in combination to control the speed of a permanent magnet electric motor.

For automotive engine-cooling fan motors, it is preferable to provide variable operating speeds so that the fan speed can be well matched to the cooling requirement. This ensures that the audible noises generated, and the electrical current drawn, are kept to the lowest achievable levels for the vehicle's specific operating conditions.

Various methods of speed control have traditionally been used, including (1) the use of electrical resistors connected in series with the fan motor, or (2) connecting the motor via an electrical switching unit to provide a "chopped" pulse width modulated current source. The advantages and disadvantages of these two conventional speed control methods are shown in the following table:

| Characteristic | Series Resistor Controlled | PWM Electronics Controlled |
| --- | --- | --- |
| Number of operating speeds | Typically two: Resistor by-passed = full speed Resistor in series = low speed | Infinitely variable speed control between defined minimum speed and full speed |
| Audible noise at low speed | Quiet | Typically motor "buzzes" at the PWM switching frequency |
| Noise at start-up | Quiet | Typically motor "buzzes" at the PWM switching frequency |
| Operating efficiency under controlled-speed operation | Poor—Energy is dissipated as heat from the resistor | Good |
| Cost | Low cost | Relatively high cost—depends on switching frequency |

For new automotive applications, series resistors are now rarely specified because of their poor efficiency under controlled-speed operation, also because they typically only offer two speed choices.

The use of PWM electronics for motor control is becoming more widespread, but this system has a significant disadvantage. PWM-controlled motors typically generate an audible "buzz" of the same frequency that is used for PWM switching. The noise is most problematic at motor start-up, where currents are momentarily high, and also at low speed operation where fan-related noise is not sufficient to mask the noise of the motor.

For some PWM applications, high frequency switching is used which reduces the audible noise level but this requires more costly electronic switching components.

Accordingly, there is a need to provide a switching arrangement for motor speed control that combines the advantages of a series resistor (quiet motor start-up and quiet operation at low speed) with the advantages of PWM motor control (infinitely variable speed control with reasonable electrical efficiency).

SUMMARY OF THE INVENTION

An object of the invention is to fulfill the need referred to above. In accordance with the principles of the present invention, this objective is achieved by providing a motor speed control system including a permanent magnet direct current electric motor. A first switch is in series with the motor. A circuit is in series with the first switch. The circuit includes a resistor and a second, pulse width modulated controlled, switch in parallel with the resistor. An electronic controller is operatively associated with the first and second switches for electronically controlling the first and second switches independently and in combination to control current to the motor to operate the motor at various speeds.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

Preferred embodiments of the invention are described in greater detail herein below with reference to the drawings wherein.

DETAILED DESCRIPTION OF THE PREFERRED EMBODIMENTS

In general, the speed control system of the invention is discussed below for an automotive engine-cooling fan motor application, but the system is also applicable for other permanent magnet direct-current motors.

Figure 1:
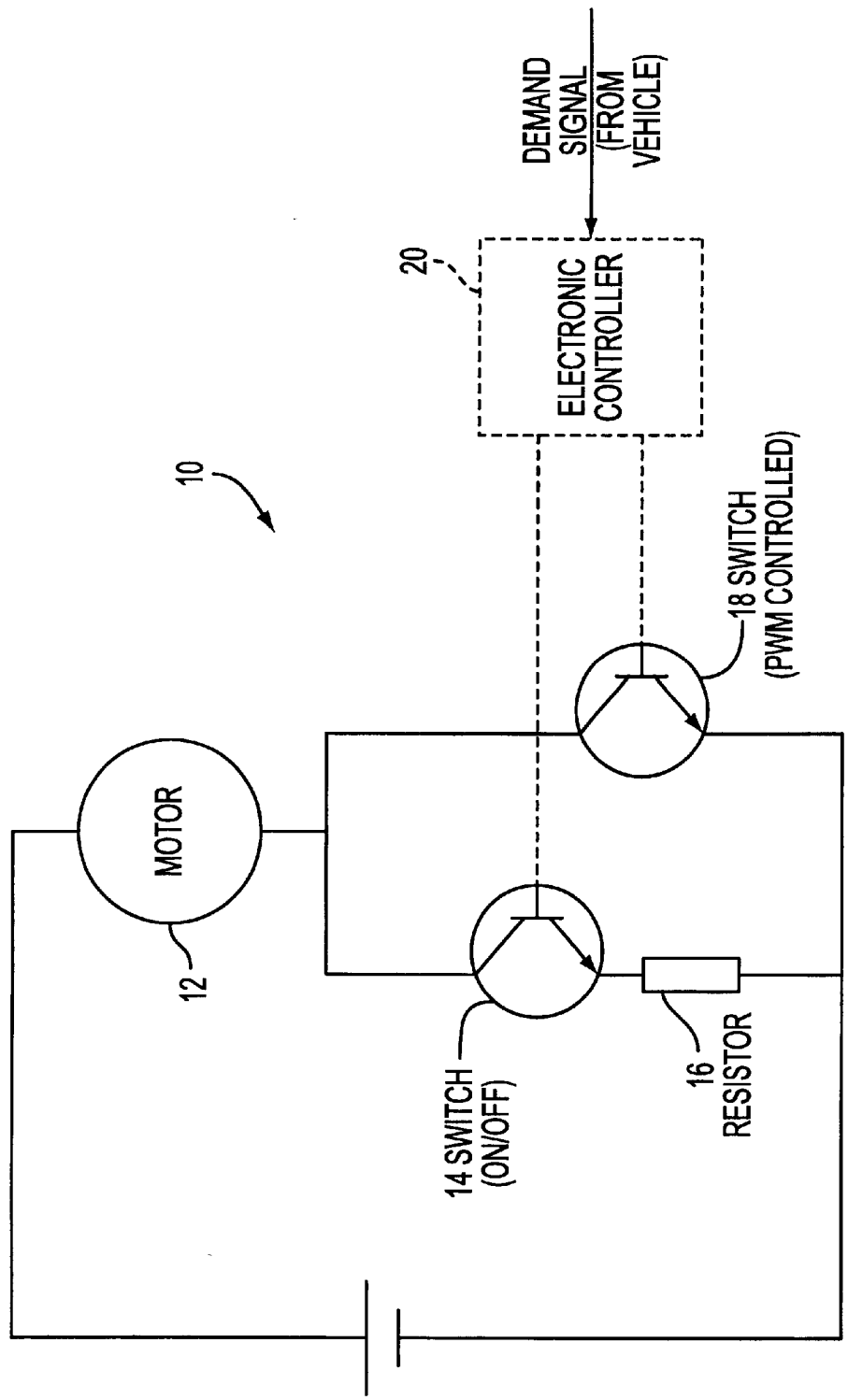
FIG. 1 is a schematic diagram of a motor speed control system including first and second switches provided in accordance with the principles of the present invention.
Figure 2:
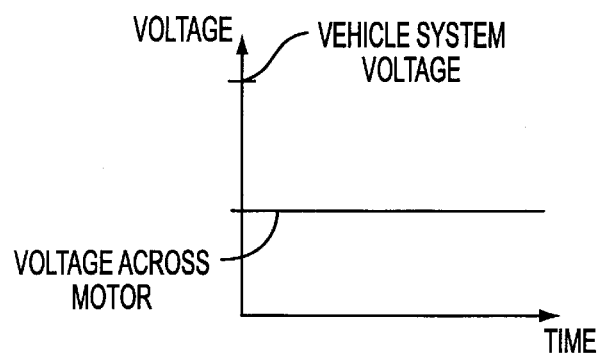
FIG. 2 is a graph of voltage versus time for a first mode of operation of the system of FIG. 1.
Figure 3:
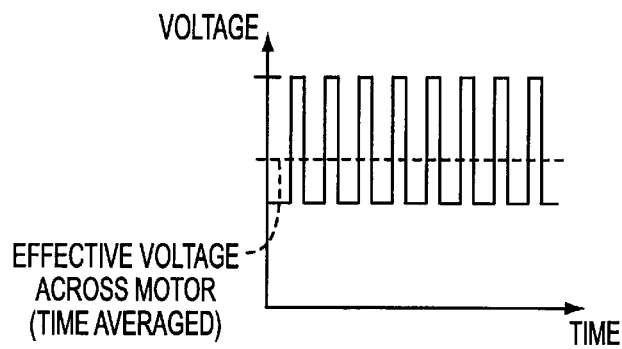
FIG. 3 is a graph of voltage versus time for a second mode of operation of the system of FIG. 1.
Figure 4:
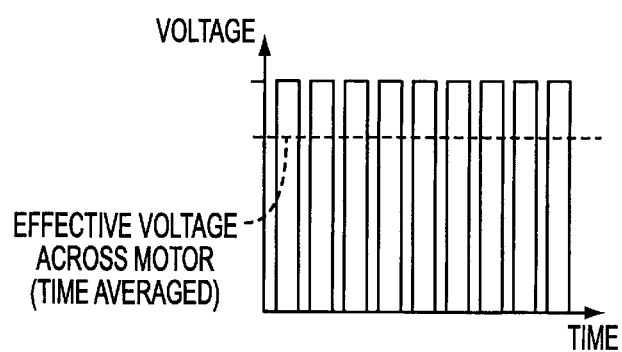
FIG. 4 is a graph of voltage versus time for a third mode of operation of the system of FIG. 1.
Figure 5:
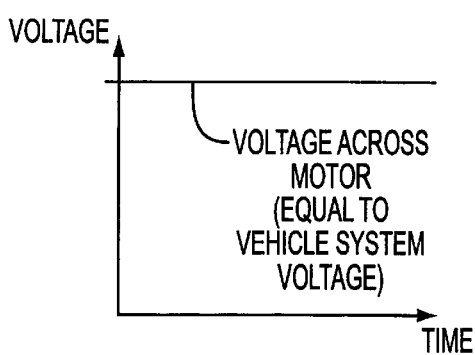
FIG. 5 is a graph of voltage versus time for a fourth mode of operation of the system of FIG. 1.

Referring now in detail to the FIG. 1, a motor speed control system, generally indicated at 10, is shown provided in accordance with principles of the present invention. The system 10 includes a permanent magnet, direct current electric motor 12; a first switch 14 operatively associated with the motor 12; a resistive element 16 in series with the motor 12 and the first switch 14; a second, pulse width modulated (PWM) controlled, switch 18 operatively associated with the motor 12; and an electric controller 20 operatively associated with the first and second switches for controlling the first and second switches independently and in combination to control current to the motor to operate the motor a various speeds, as explained more fully below. The controller 20 receives a "demand signal" from the vehicle's electrical system and, per a predetermined program, controls the switches 14 and 18 accordingly.

The first switch 14 is an "on-off" type switch (e.g., an electronically controlled switch) and the resistive element 16 is preferably a resistor.

In one embodiment of the invention, there are four modes of operation as indicated in the table below.

TABLE 1

| Mode | Operating range | Switch 14 | Switch 18 |
|---|---|---|---|
| — | No operation | Off | Off |
| 1 | Motor start-up and lowest speed | On | Off |
| 2 | Low to medium speed | On | PWM-controlled |
| 3 | Medium to full speed | Off | PWM-controlled |
| 4 | Full speed | Off | On |

The modes of operation are as follows:

Mode 1 (start-up): The current to the motor 12 is supplied via the resistor 16 only. The resistor 16 limits inrush current. There is no PWM-controlled component to the current source so there is no PWM-related noise from the motor 12.

Mode 1 (steady state operation): The motor 12 operates at its lowest speed. This speed is determined by the value of the resistor 16. Since there is no PWM-controlled component to the current source, there is no PWM-related noise from the motor 12.

Mode 2: The motor is partially supplied with current by the series resistor 16 and partly via the PWM-controlled switch 18 operating at less than a fully on condition. The motor speed can be adjusted by controlling the PWM signal. The actual voltage seen across the motor is a steady level with the PWM-controlled component superimposed. The resultant voltage contains significantly less fluctuation than would be seen for a fully PWM-controlled supply, thereby reducing the amount of PWM-related motor noise.

Mode 3: The motor 12 is supplied with current solely via the PWM-controlled switch 18. No current flows through the series resistor 16, thereby eliminating energy waste through heating of the resistor 16. PWM-related noise from the motor 12 can be expected, but this noise is likely to be masked by typical fan noise in this speed range.

Mode 4: The PWM-controlled switch 18 is operating at a fully on condition (100% on). This means the motor 12 operates at steady state with full battery voltage across the motor.

The nature of the voltage applied to the motor 12 depends on the operating mode. FIGS. 2–5 show the voltage for the modes 1–4, respectively.

A second, simplified embodiment of controlling the switches 14 and 18 to control the speed of the motor requires the same components as discussed above, but fewer modes of operation are defined as shown in Table 2.

TABLE 2

| Mode | Operating range | Switch 14 | Switch 18 |
|---|---|---|---|
| — | No operation | Off | Off |
| A | Motor start-up and lowest speed | On | Off |
| B | Low to full speed | On | PWM-controlled |
| C | Full speed | On | On |

Thus, in this embodiment, the first and second switches and the controller are constructed and arranged to provide 1) a start-up mode of operation wherein current to the motor is supplied solely by the first switch, 2) an intermediate speed mode of operation wherein current to the motor is supplied partly by the first switch and partly by the second switch operating at less than a fully on condition, and 3) a full speed mode of operation wherein current to the motor is supplied with both the first switch and the second switch operating at fully on condition.

This alternative implementation may be easier to control than the previously described implementation, but would be less efficient in the medium to high-speed range. This is because in this speed range, the resistor 16 would still carry some current, and thus dissipate some energy as heat.

Figure 6:
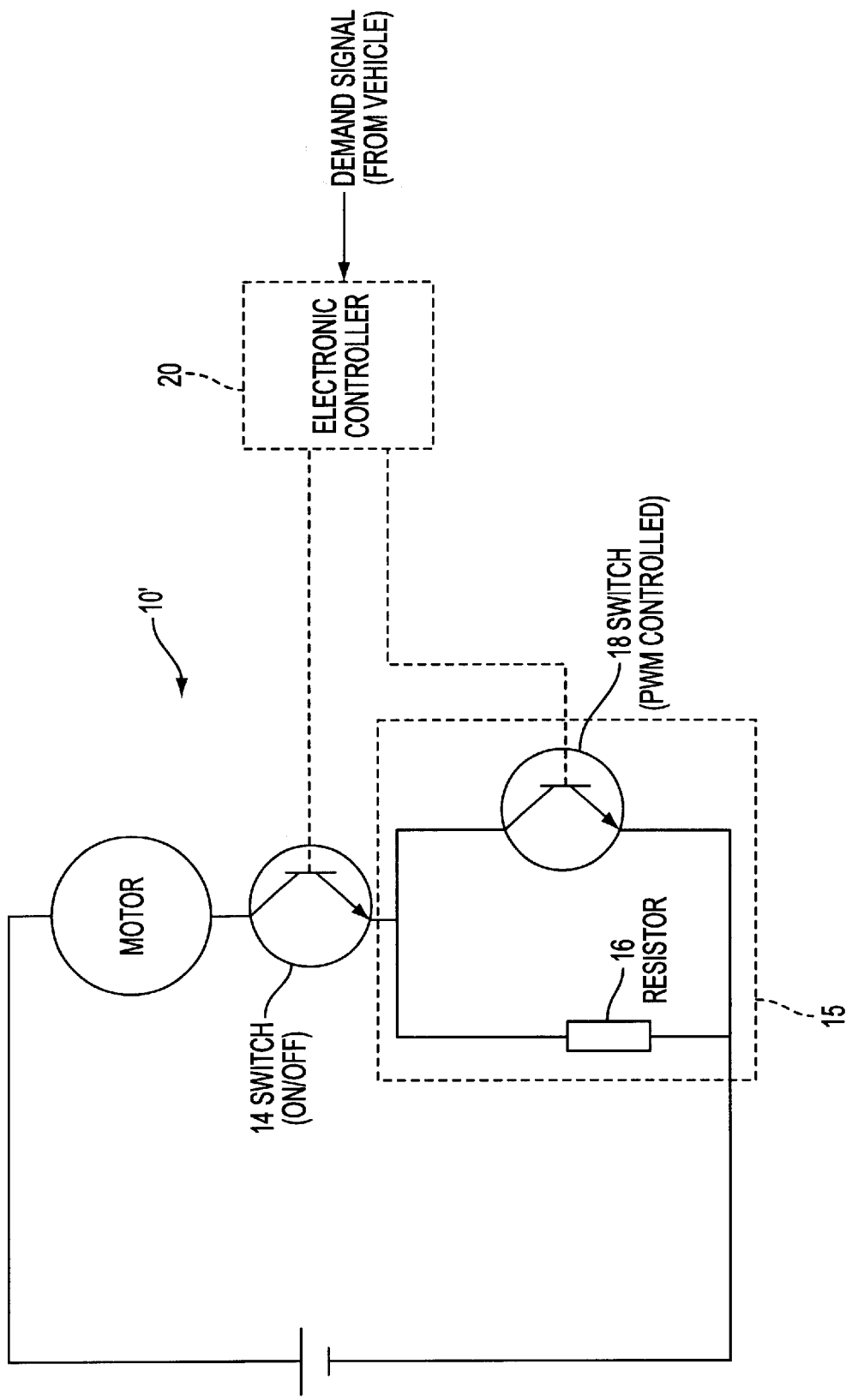
FIG. 6 is a schematic diagram of a motor speed control system including first and second switches provided in accordance with another embodiment of the invention.

With reference to FIG. 6, a second embodiment of the speed control system 10' is shown. Instead of providing the switches 14 and 18 in parallel as in FIG. 1, the switches 14 and 16 are in a series configuration. In particular, switch 14 is in series with the motor 12 and in series with a circuit 15. The circuit 15 includes the resistor 16 in parallel with the second switch 18. In this way, turning off only the first switch 14 turns the motor 12 off completely. The first and second switches and the controller are constructed and arranged to provide 1) a start-up mode of operation wherein current to the motor is supplied solely by the switch 14, 2) an intermediate speed mode of operation wherein current to the motor is supplied partly by the switch 14 and partly by the switch 18 operating at less than a fully on condition, and 3) a full speed mode of operation wherein current to the motor is supplied by the switch 14 and by the switch 18 operating at fully on condition.

Unlike the embodiment of FIG. 1, in the system 10', when the switch 18 is on and switch 14 is off, power is being dissipated through the resistor 16.

For further motor control, it is within the contemplation of the invention to include in the circuit 15, a third switch (not shown) provided in series with the resistor 16. The electronic controller 20 can also control the third switch.

The speed control system of the invention reduces motor noise during low-speed operation and during start-up. "Inrush" current is reduced during motor start-up, thus reducing the stress on the vehicle electrical system. In addition, low frequency (<500 Hz) PWM switching can be used, which enables less expensive electronic components to be specified than components required for typical PWM-controlled applications.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A motor speed control system comprising:
   a permanent magnet direct current electric motor,
   a first switch in series with the motor;
   a circuit in series with the first switch, the circuit at least including a resistor and a second, pulse width modulated controlled, switch in parallel with the resistor, and an electronic controller operatively associated with the first and second switches for electronically controlling the first and second switches independently and in combination to control current to the motor to operate the motor at various speeds.

2. The motor speed control system of claim 1, wherein the first and second switches and the controller are constructed and arranged to provide 1) an off mode of operation wherein the first switch is off providing no current to the motor, 2) a start-up mode of operation wherein current to the motor is supplied solely by the first switch, 3) an intermediate speed mode of operation wherein current to the motor is supplied partly by the first switch and partly by the second switch operating at less than a fully on condition, and 4) a full speed mode of operation wherein current to the motor is supplied by the first switch and by the second switch operating at fully on condition.

* * * * *